US007478779B2

(12) United States Patent
Nguyen et al.

(10) Patent No.: US 7,478,779 B2
(45) Date of Patent: Jan. 20, 2009

(54) DEVICE AND METHOD FOR SEALING AND LIGHTING A BALLOON

(76) Inventors: Phu Nguyen, 5716 Bay Side Dr., Orlando, FL (US) 32819; Logan A. Nguyen, 2411 Jennifer Hope Blvd., Longwood, FL (US) 32779

( * ) Notice: Subject to any disclaimer, the term of this patent is extended or adjusted under 35 U.S.C. 154(b) by 738 days.

(21) Appl. No.: 11/143,278

(22) Filed: Jun. 1, 2005

(65) Prior Publication Data

US 2005/0269442 A1 Dec. 8, 2005

Related U.S. Application Data

(60) Provisional application No. 60/577,329, filed on Jun. 5, 2004.

(51) Int. Cl.
*B64B 1/40* (2006.01)

(52) U.S. Cl. .......................................... 244/31; 244/24

(58) Field of Classification Search .................. 244/31, 244/24; 446/34
See application file for complete search history.

(56) References Cited

U.S. PATENT DOCUMENTS

| | | | | |
|---|---|---|---|---|
| 4,737,133 | A | 4/1988 | Neumeier | |
| 4,794,498 | A * | 12/1988 | Neumeier | 362/186 |
| 4,890,203 | A * | 12/1989 | Watson | 362/102 |
| 5,070,438 | A * | 12/1991 | Marshall | 362/206 |
| 5,215,492 | A | 6/1993 | Kubiatowiez | |
| 5,496,203 | A * | 3/1996 | Murray | 446/222 |
| 5,795,211 | A | 8/1998 | Carignan et al. | |
| 5,807,157 | A | 9/1998 | Penjuke | |
| 5,879,219 | A | 3/1999 | Penjuke | |
| 5,947,581 | A | 9/1999 | Schrimmer et al. | |
| 6,106,135 | A | 8/2000 | Zingale et al. | |
| 6,238,067 | B1 | 5/2001 | Hirsch | |
| 6,371,638 | B1 | 4/2002 | Zingale et al. | |
| 6,467,939 | B2 | 10/2002 | Deutsch et al. | |
| 6,482,065 | B1 | 11/2002 | Blackman | |
| 6,602,105 | B1 | 8/2003 | Sussell | |
| 6,719,020 | B1 | 4/2004 | Bisotto | |
| 7,108,446 | B2 * | 9/2006 | Clark | 404/9 |
| 2006/0291217 | A1 * | 12/2006 | Vanderschuit | 362/363 |

* cited by examiner

*Primary Examiner*—J. Woodrow Eldred
(74) *Attorney, Agent, or Firm*—Christine Q. McLeod; Beusse Wolter Sanks Mora & Maire PA

(57) ABSTRACT

An apparatus for sealing and illuminating a balloon includes a housing for sealing insertion into a neck of a balloon. A flow path within the housing conducts an inflation gas from an inlet to an outlet of the housing, and a flow control system disposed in the flow path allows the inflation gas to flow from the inlet to the outlet. The apparatus includes a light source mounted in conjunction with the housing and a power source disposed within the housing providing power for the light source. A switch mounted in conjunction with the housing is operable to selectively connect the power source to the light source by completing a circuit between the power source and the light source. The apparatus also includes a switch activating member annularly disposable around the housing to operate the switch.

9 Claims, 10 Drawing Sheets

DEVICE AND METHOD FOR SEALING AND LIGHTING A BALLOON

This application claims priority to U.S. Provisional Application Ser. No. 60/577,329 filed on Jun. 5, 2004, and incorporated herein by reference.

BACKGROUND

1. Field of the Invention

The present invention relates to the field of accessory lights for illuminating balloons.

2. Description of the Background Art

It has been proposed to use a light to illuminate balloons from the inside. Internally illuminated balloons are attractive and therefore desired by adults and children. Illuminated balloons have been used as novelty items at fairs and circuses to arrangements placed outside during evening events.

SUMMARY OF THE INVENTION

The present invention advantageously provides a device and method for sealing, inflating and lighting latex balloons. The light comprises a housing for connecting the light to the neck of the balloon; a power source positioned within the housing; a light source positioned within the housing and connected to the power source; and a switch positioned within the housing and connected to the power source and to the light source so as to energize the light source responsive to airtight seal between the housing and the balloon; a flow control system to allow gas into the balloon but not to exit the balloon.

The housing provides an enclosure for protecting the other components of the balloon light and, preferably, also serves to connect the balloon light to the balloon at the neck of the balloon. The housing comprises a material and optical shape that allows light emitted by the light source to shine through so that it reduces a bright spot and provide even illumination of the balloon.

The switch is activated when the housing is inserted into the neck of the balloon creating an airtight seal between the balloon and the housing of the balloon light. The light source is energized when the switch is activated, thereby lighting the balloon.

The balloon light may comprise a shape for forming a visually perceptible light image when the light source is energized by the insertion of the device into the neck of a balloon.

DETAILED DESCRIPTION OF THE PREFERRED EMBODIMENT

The present invention advantageously provides a device and method for sealing, inflating and lighting latex balloons. The device, when inserted into the neck of the balloon, creates an airtight seal between the housing of the device and the balloon. The balloon light energizes responsive to the airtight seal between the balloon and the housing, so that the light is off when the device is not in the balloon. The end of the device exposed to the outside of the balloon contains a one-way valve to allow gas into the balloon but preventing gas from exiting the balloon. Air paths within the housing of the device allows gas to flow pass the flow control system and into the balloon. Further, the end of the device within the balloon contains a light to illuminate the balloon from its interior. The housing material and optical shape helps refract the light which prevent a concentrated bright spot or hot spot within the balloon and provide even illumination of the balloon. The overall weight of the device with the power source is light enough to be lifted by a helium-filled latex balloon for the life of the helium contained within the balloon. The present invention permits the balloon to be deflated when the device is inserted into the neck of the balloon and creating an airtight seal between the housing of the device and the balloon. Then the balloon may be inflated repeatedly as needed without removing the device.

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime notation when used indicates similar elements in alternative embodiments.

Figure 1:
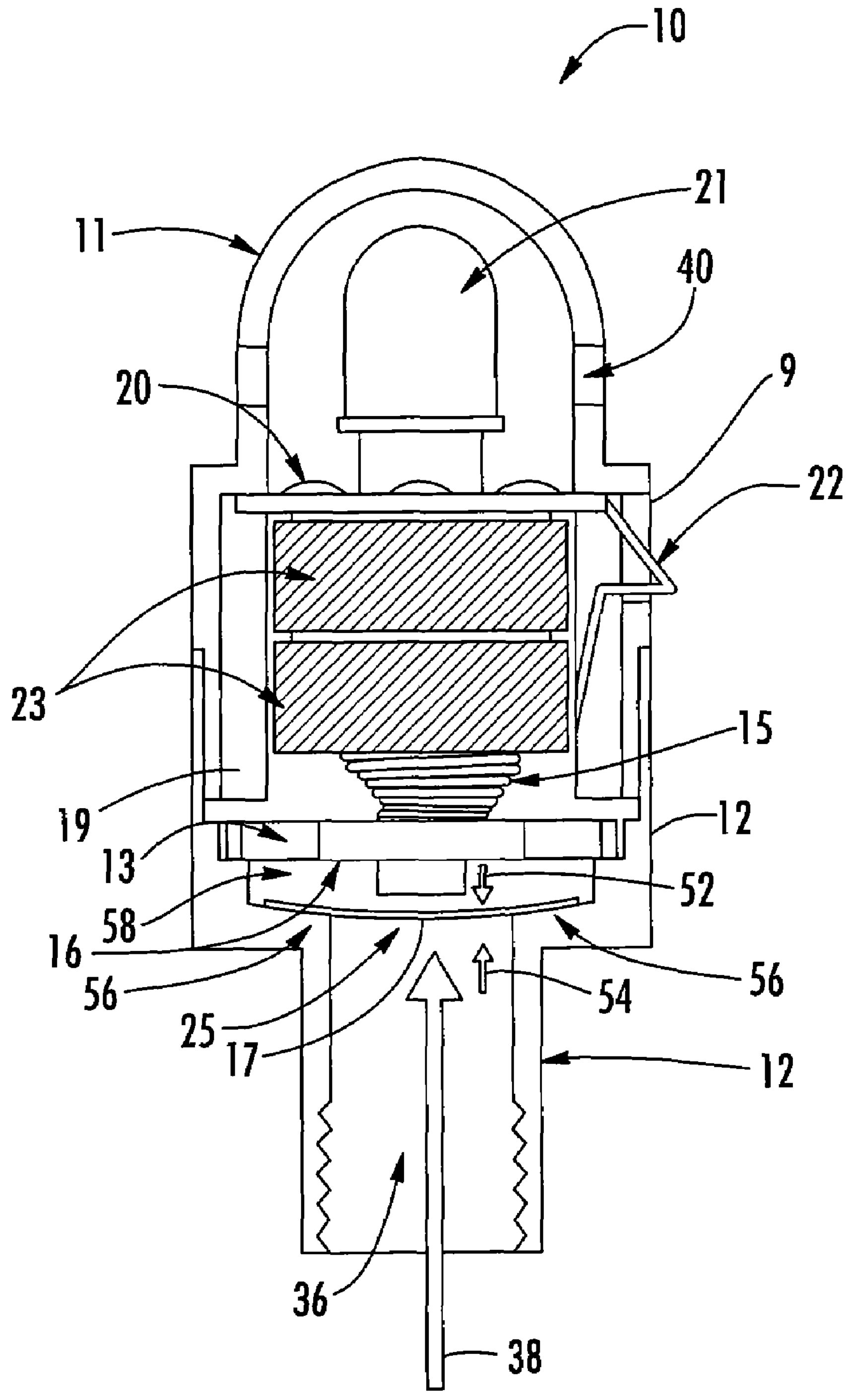
FIG. 1 is a cross section view showing the balloon light according to a preferred embodiment of the present invention.
Figure 2:
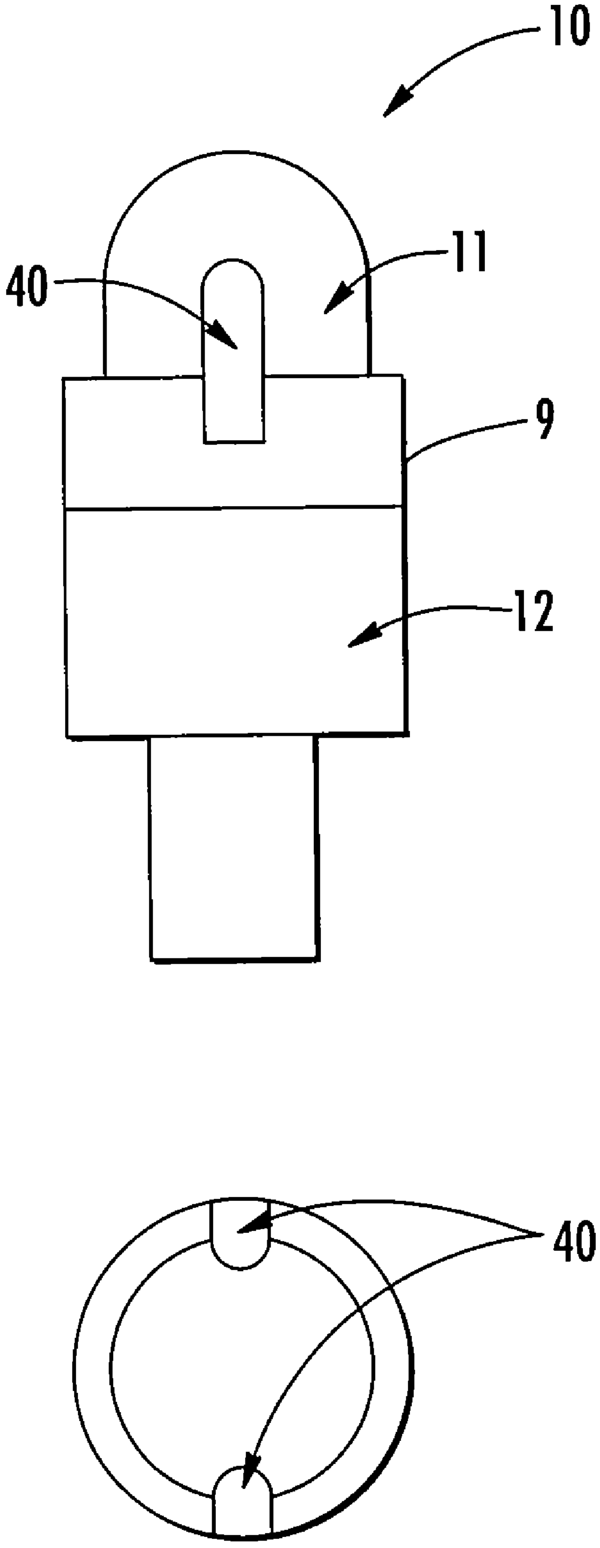
FIG. 2 is a side elevation of the balloon light shown in FIG. 1.
Figure 3:
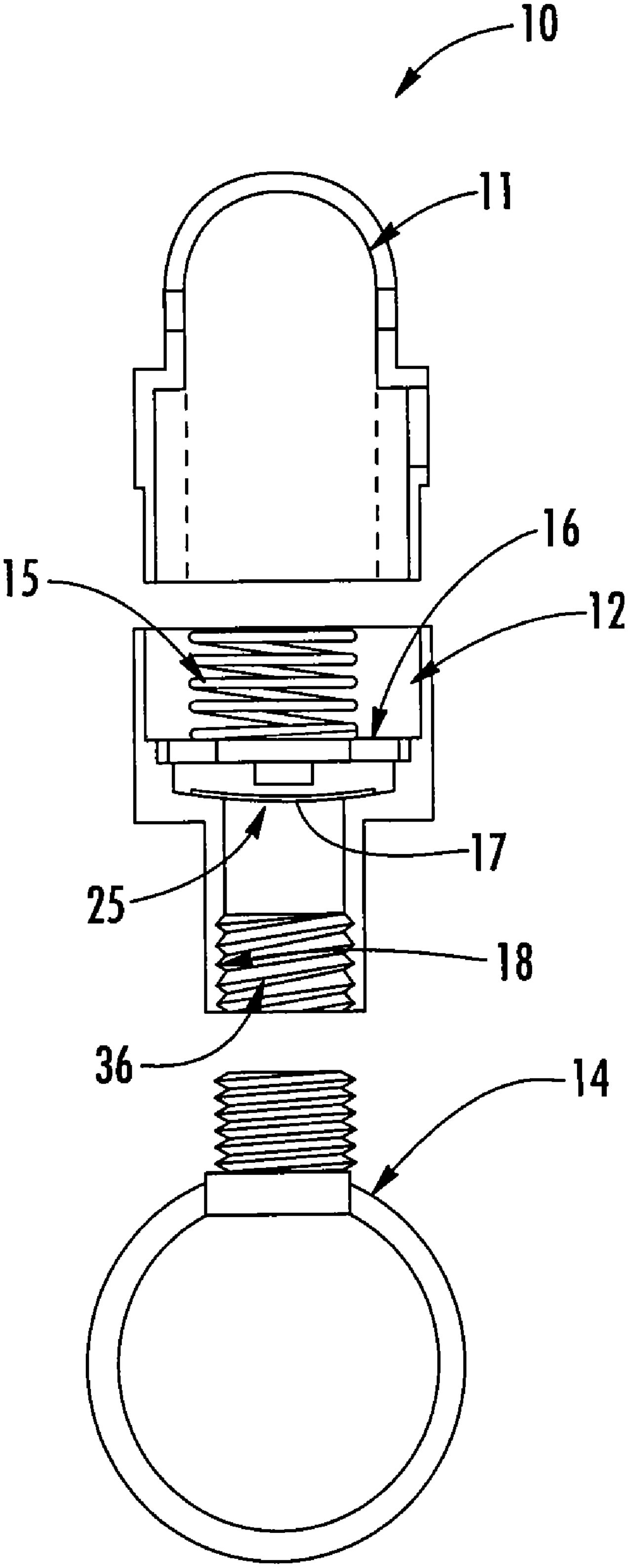
FIG. 3 is a cross section view of the housing of the balloon light of FIG. 1.
Figure 4:
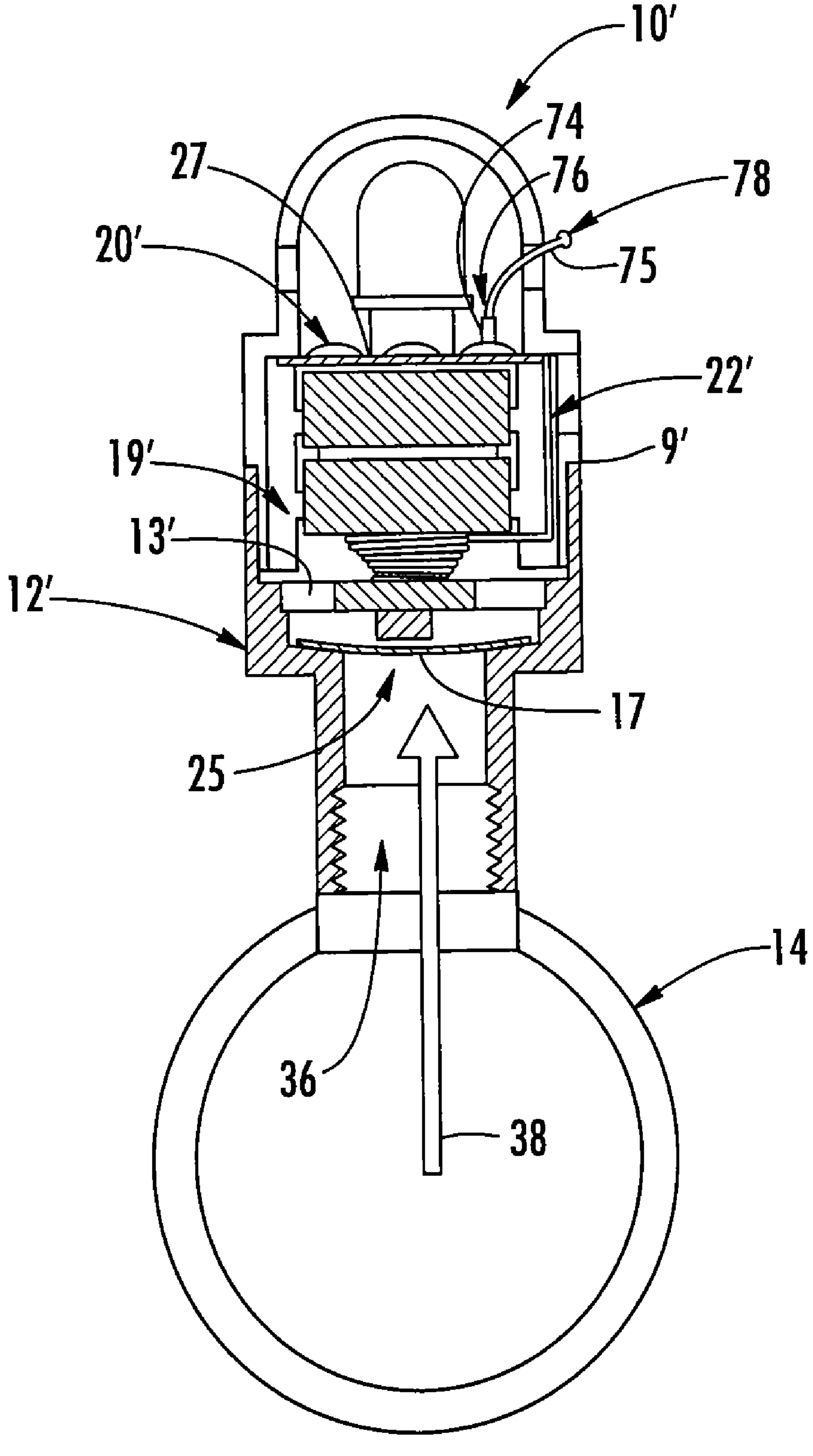
FIG. 4 is a cross section view of an additional embodiment of the invention.
Figure 5:
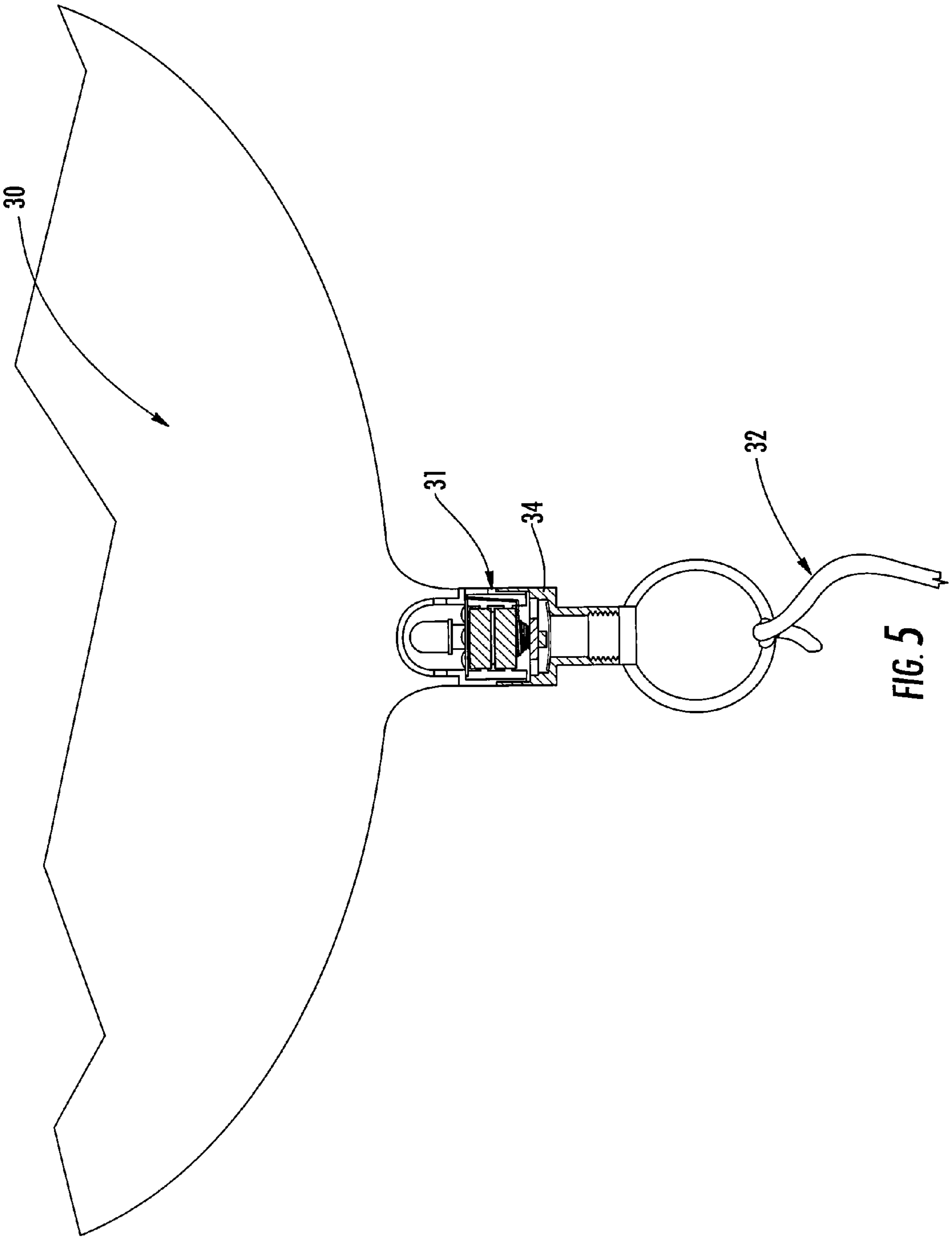
FIG. 5 shows the balloon light of FIG. 1 in place in the neck of a latex balloon.

FIGS. 1 through 5 illustrate the present invention, a self-contained, self-sealing, balloon light 10 for a balloon 30, such as a latex toy balloon, having a cylindrical or tapered neck 31 currently utilized in many different sized balloons. The balloon light 10 comprises a housing 9, for example, comprising an upper housing 11 and a lower housing 12, a power source 23, a light source 21, and a switch 20 comprising a cantilever switch contact 22 connected in a circuit together with the other electrical components. The housing 9, embodiments of which are shown in FIGS. 1-3, serves to enclose the electrical components, including the light source 21 and power source 23. The housing 9 serves to connect the balloon light 10 to the neck 31 of the balloon 30, as shown in FIG. 5. The power source 23, for example, comprising one or more batteries, is positioned within the housing 9 connected to an electrical circuit, as shown in FIGS. 1 and 4. A light source 21, which those skilled in the art will know may be any suitable light, such as a light emitting diode, is positioned within the upper housing 11 and is connected to the power source 23 through the electrical circuit. A switch 20 is connected to the light source 21 through the electrical circuit but is not connected to the power source 23 until the housing is inserted into the neck 31 of the balloon 30. The sealing action of the balloon neck 31 against the housing 9 pushes the cantilever contact switch 22 of the switch 20 against the power source 23 so as to close the circuit, initializing switch 20 and energizing the light source 21. Those skilled in the art will realize that the switch 20 may include a known integrated circuit providing functions related to controlling power flow to the light source 21.

The skilled artisan will know that balloon 30, particularly in currently used latex balloons, has a cylindrical or slightly tapered neck 31 that will stretch to at least twice its relaxed size. Balloon 30 is also available in various sizes, as an example, 12" diameter, 14" diameter, 16" diameter, etc. The housing 11 and 12 of the balloon light 10 may have different diameters to accommodate different sized balloon 30. The present invention is intended to connect to any such type balloon neck 31.

The housing 9 for the balloon light 10, best shown in FIGS. 1-4, may include a translucent or transparent material so as to allow emitted light to shine through the housing 9. For example, the upper housing 11 may be formed from a translucent or transparent material shaped in a configuration for directing or dispersing light emitted from the light source 21 into the interior of the balloon 30, such as a Fresnel lens. In another embodiment, the upper housing 11 may include an aperture (not shown) to allow light from the light source 21 to pass therethrough. In addition, the lower housing 12' preferably is fabricated from ultrasonically sealed plastic material, thereby comprising an enclosure for the flow control system 25.

The flow control system 25 may contain three parts: the lower housing 12, 12', the lid cover 16, and a membrane 17 that covers the air path opening 36. The membrane 17 may be formed from an elastic material capable of being deformed by a pressure of a human breath. In an embodiment, the membrane 17 may be formed from silicone, and may be coated, for example, on a portion 56 of the membrane 17 that contacts the lower housing 12 with a sealant, such as a petroleum jelly, to improve a sealing ability of the membrane 17. The membrane 17 may be displaced from contact with the lower housing 12, by pressure exerted by an inflation gas 38 and allowing the inflation gas 38 to enter through the opening 36. The configuration of the lid cover 16 with the lower housing 12 and 12' limits movement of membrane 17 between the lid cover 16 and housing 12 and 12' so that the membrane 17 is displaceable, for example, at portion 56, to allow the inflation gas 38 to enter while preventing the membrane 17 from becoming misaligned so as to defeat a flow controlling capability, such as becoming lodged in an unsealed position. In an aspect of the invention, a chamber 58 formed between the lower housing 12 and the lid cover 16 may be configured to limit horizontal and vertical movement of the membrane 17 within the chamber 58. The elastic property of the membrane 17 wanting to lay flat, along with the sealant creates a seal against the inner surface of housing 12 and 12' even with little or no internal pressure. However, with internal pressure available after minimal inflation of the balloon 30, the pressure will provide additional push to membrane 17 against the inner surface of housing 12 and 12' and create an airtight seal over the opening 36. Accordingly, the membrane 17 is responsive to a first pressure (represented by arrow 52) of the inflation gas 38 within the balloon 30 to cover and seal the opening 36 and is responsive to a second pressure (represented by arrow 54), greater than the first pressure, of the inflation gas 38 being injected into the opening 36 to move the membrane 17 away from covering the opening 36, thereby allowing entry of the inflation gas 38.

Figure 9:
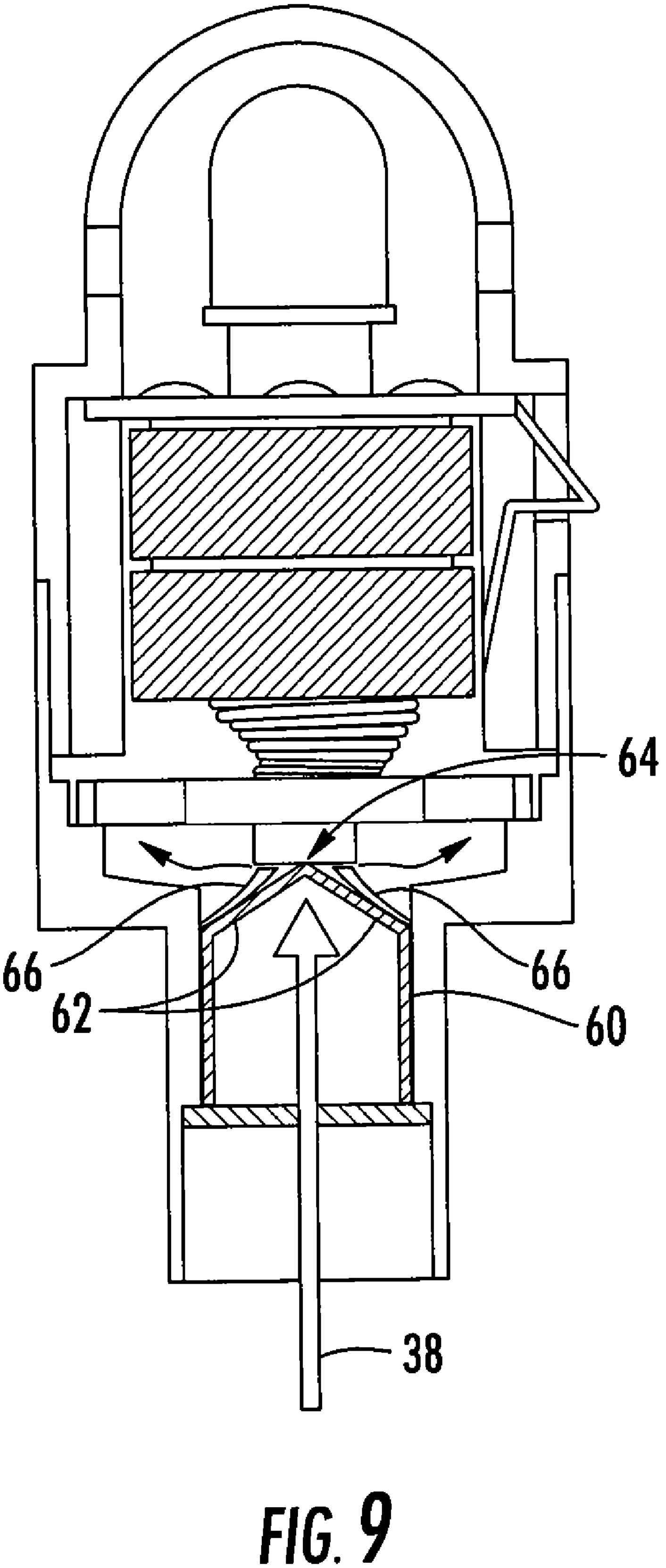
FIG. 9 is a cross section view of another exemplary embodiment of the invention.

In an aspect of the invention depicted in FIG. 9, the flow control system 25 may include a peaked member 60 having flaps 62 that seal an opening 64 of the member 60 in an original, or undisplaced, state. The flaps 62 may be displaceable away from the opening 64 in a displaced state (indicated by dotted lines 66) in response to pressure from the inflation gas 38 to allow the inflation gas 38 to flow therethrough. The flaps 62 may be coated with a sealant, such as petroleum jelly, at the opening 64 to improve a sealing ability of the peaked member 60.

Figure 10:
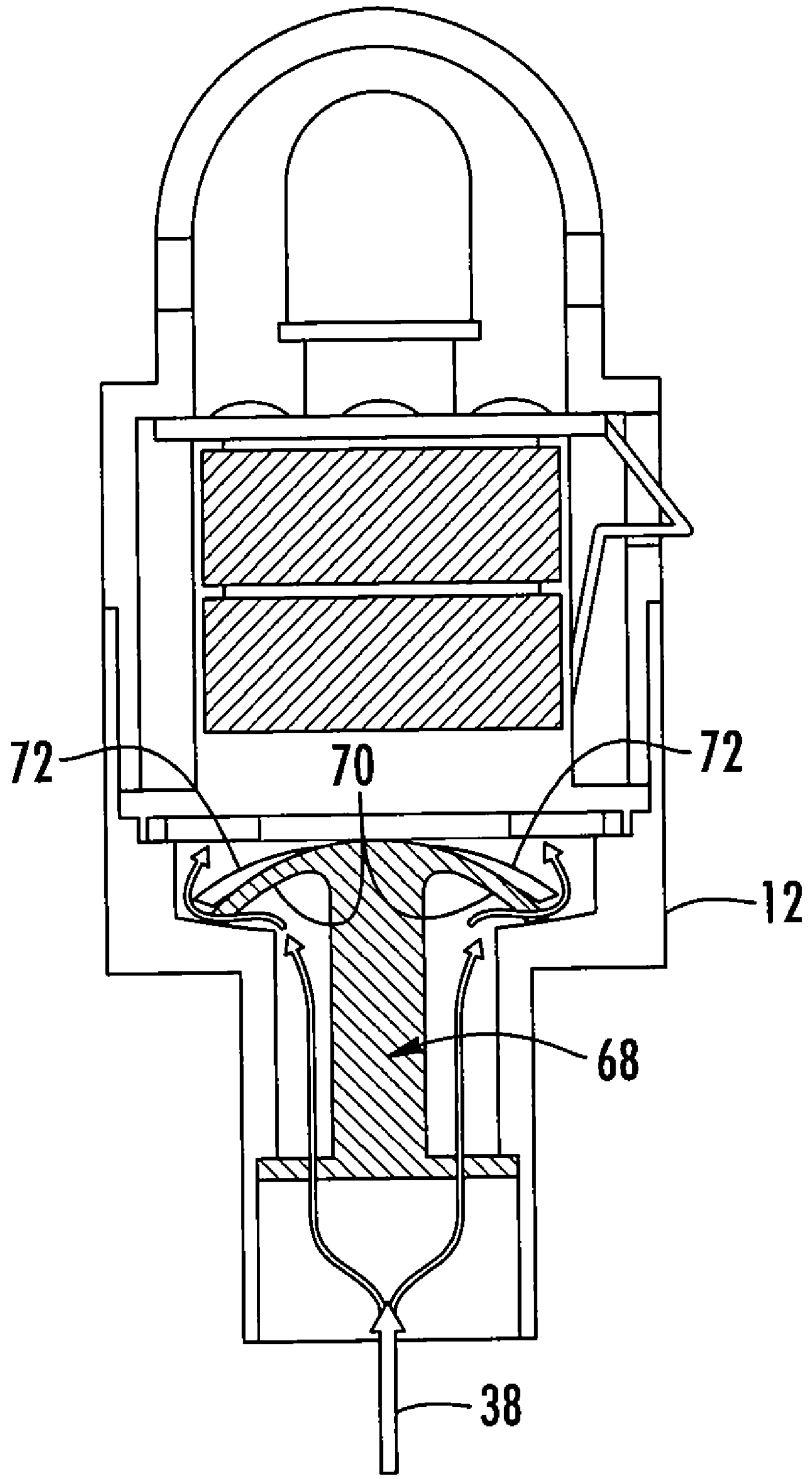
FIG. 10 is a cross section view of another exemplary embodiment of the invention.

In an aspect of the invention depicted in FIG. 10, the flow control system 25 may include an umbrella-shaped member 68 having a rim portion 70 that seals against the lower housing 12 in seated, or undisplaced, state. The rim portion 70 may be displaceable away from contact with the lower housing 12 in a displaced state (indicated by dotted lines 72) in response to pressure from the inflation gas 38 to allow the inflation gas 38 to flow past the umbrella-shaped member 68. The rim portion 70 may be coated with a sealant, such as petroleum jelly, where they contact the lower housing 12 to improve a sealing ability of the umbrella-shaped member 68.

As shown in FIGS. 1, 3 and 4, the lower housing 12 may have threads 18 complementary to those found on ribbon loop 14. By screwing onto the ribbon loop 14, the helium-filled balloon 30 with the balloon light 10 has a convenient place to tie a long ribbon 32 for use in holding the balloon 30. Alternatively, the balloon 30 and housing 9 may connect to the ribbon 32 substantially by adhesive tape, or by other methods of connecting as known to those skilled in the art. As illustrated in FIGS. 1-5, the housing 9 contains at least one a flow path 19 within the housing 9 conducting the inflation gas 38 from an inlet, such as opening 36, to an outlet 40 of the housing 9 to allow gas into the balloon 30 once the balloon light is inserted into the balloon neck 31. The flow path 19 may include an aperture 13 through the lid cover 16.

An aspect of the present invention includes the ability to form a visually perceptible image when the light source 21 is energized. For example, to enhance the light image, the balloon light 10 may be configured to emit light in one or more colors. The light source 21 itself may emit colored light, or the housing 11 and 12 may comprise material having one or more colors to thereby produce a visually perceptible image in color inside the balloon 30. Particularly useful and aesthetic applications of this aspect of the invention include forming emblem images which appear perceptible to the eye as the balloon 30 is back lit from the inside. The image may advantageously form an advertisement which is displayed as the balloon 30 is illuminated. Such an advertisement may include a company logo.

Another embodiment of the invention is shown in FIG. 4. In this embodiment, the switch 20' comprises an integrated circuit 27 and a contact switch 22' connected to the power source 23 and the switch 20'. The contact switch 22' completes the circuit between the light source 21 and the power source 23. The integrated circuit in switch 20' may contain but not limited to the following; a manual select button, a motion sensor, an infrared receiver and or a RF receiver. Those skilled the art will realize that the addition of these components will allow for control of the balloon light 10 through manual depression of the button, sudden motion, infrared transmission and or wireless transmission. For example, the switch 20' may intermittently energize the light source 21 responsive to sudden motion of the balloon 30 to thereby create visual effects with the emitted light. In addition, intermittent energizing of the light source 21 may be accomplished at predetermined timed intervals to create further light effects. For example, balloon lights 10 having different predetermined energizing intervals could be connected to a number of balloon 30, so that each balloon 30 flashes at different times relative to the other balloon 30.

Figure 6:
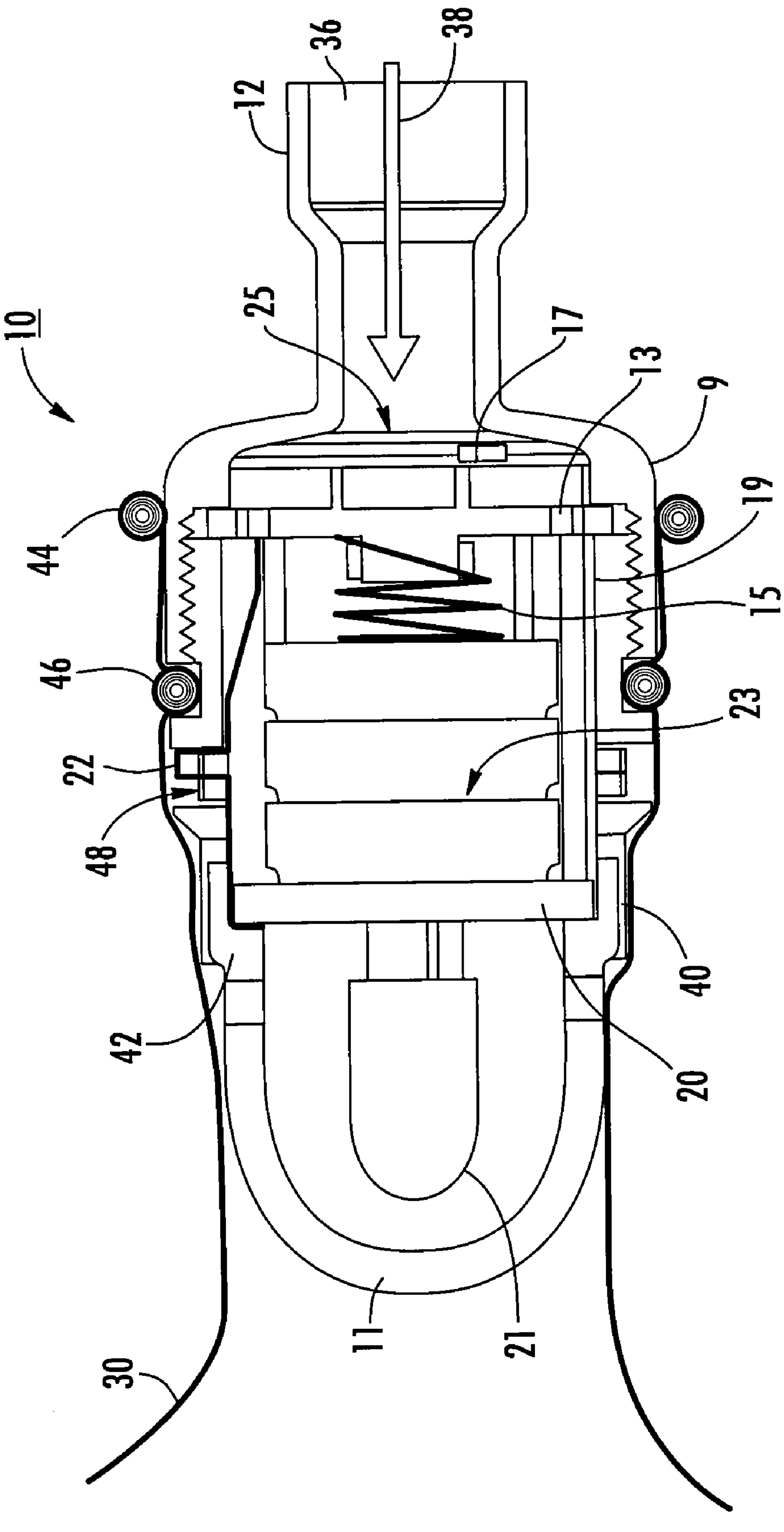
FIG. 6 is a cross section view of an exemplary embodiment of the invention configured in a non-lighted mode.
Figure 7:
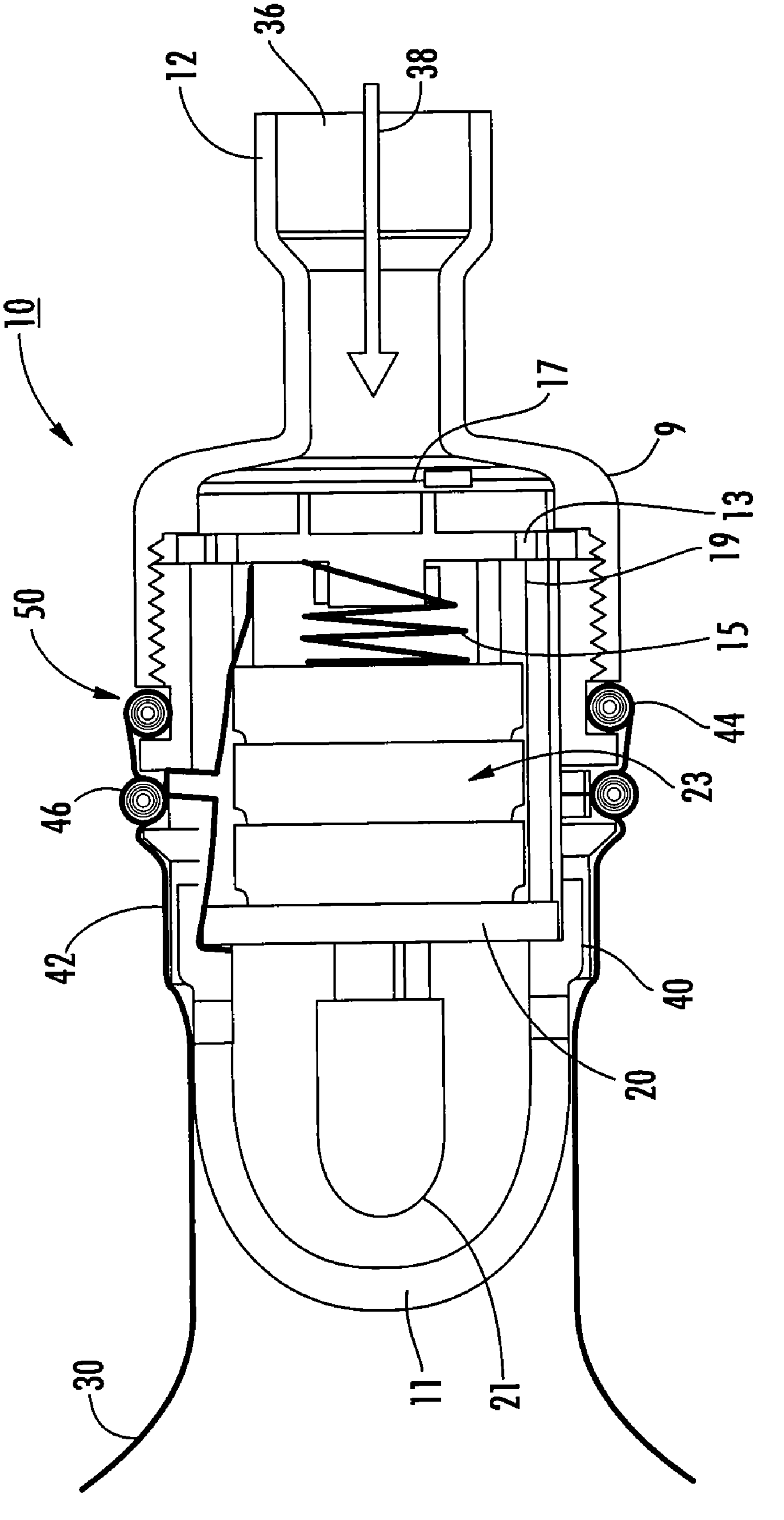
FIG. 7 is a cross section view of an exemplary embodiment of the invention configured in a lighted mode.

FIG. 6 is a cross sectional view of an exemplary embodiment of the invention configured in a non-lighted mode, and FIG. 7 is a cross sectional view of an exemplary embodiment of the invention configured in a lighted mode. The exemplary embodiment shown in FIGS. 6 and 7 includes a housing 9 for sealing insertion into a neck 42 of the balloon 30. The housing 9 includes flow path 19 within the housing 9 for conducting the inflation gas 38 from an inlet, such as opening 36, to an outlet 40 of the housing 9. Flow control system 25 may be disposed in the flow path 19 allowing the inflation gas 38 to flow from the opening 36 to the outlet 40 to inflate a balloon 30 having its neck 42 sealingly disposed around the housing 9. In an aspect of the invention, sealing may be accomplished by ensuring that the housing 9 is inserted sufficiently far in the neck 42 so that the marginal bead 44 of the balloon 30 is positioned past the outlet 40 as shown in FIGS. 6 and 7.

A light source 21 may be mounted in conjunction with the housing 9, and a power source 23, such as one or more batteries, may be disposed within the housing 9 for providing power to the light source 21. The switch 20 may be mounted in conjunction with the housing 9 and may be operable to selectively connect the power source 23 to the light source 21 by completing a circuit between the power source 23 and the light source 21. A switch activating member 46, such as an o-ring, may be annularly disposable around the housing 9 to selectively operate the switch 20. For example, a portion of the switch 20, such as the cantilever switch contact 22, is configured to protrude radially outward from housing 9 so that when the switch activating member 46 is positioned around the housing 9 over the protruding portion, the switch 20 is operated to close the circuit and connect the power source 23 to the light source 21.

In an aspect of the invention, the housing 9 includes a switch activating member annular recess 48 formed in an outer surface of housing 9 for receiving the switch activating member 46. A portion of the switch 20, such as the cantilever switch contact 22, protrudes radially into the recess 48 so that when the switch activating member 46 is positioned in the recess 48 as shown in FIG. 7, the protruding portion of the switch is moved and the switch 20 is operated to close the circuit and connect the power source 23 to the light source 21. The recess 48 provides support for keeping the switch activating member 46 in position to activate switch 20. The switch activating member 46 may be formed from an elastic material so that the member seats sufficiently tight in the recess 48 to activate the switch 20 and also allows the member 46 to be stretched to remove it from the recess 48 to allow the switch 22 to return to a position disconnecting the power source 23 from the light source 21.

The housing 9 may further include a second annular recess 50 formed in an outer surface of housing 9 for receiving at least one of the switch activating member 46 and the marginal bead 44 of the balloon. For example, the second annular recess 50 may be spaced apart from the switch activating recess 48 on a side away from the outlet 40 to provide, for example, a place to keep the switch activating member 46 when it is not being used to activate the switch 20. In this position, as shown in FIG. 6, the switch activating member 46 provides addition sealing against the housing 9 of a portion of the balloon neck 42 disposed in the second annular recess 50. The switch activating member 46 may be moved from the switch activating member annular recess 48 to the second recess 50 to alternately activate and de-activate the switch 20. In another aspect of the invention, as shown in FIG. 7, the second annular recess 50 may be used to retain the marginal bead 44 of the balloon 30, while the switch activating member 46 is moved into and out of the switch activating member annular recess 48, such as in a direction towards the opening 40, to alternately activate and de-activate the switch 20.

Figure 8:
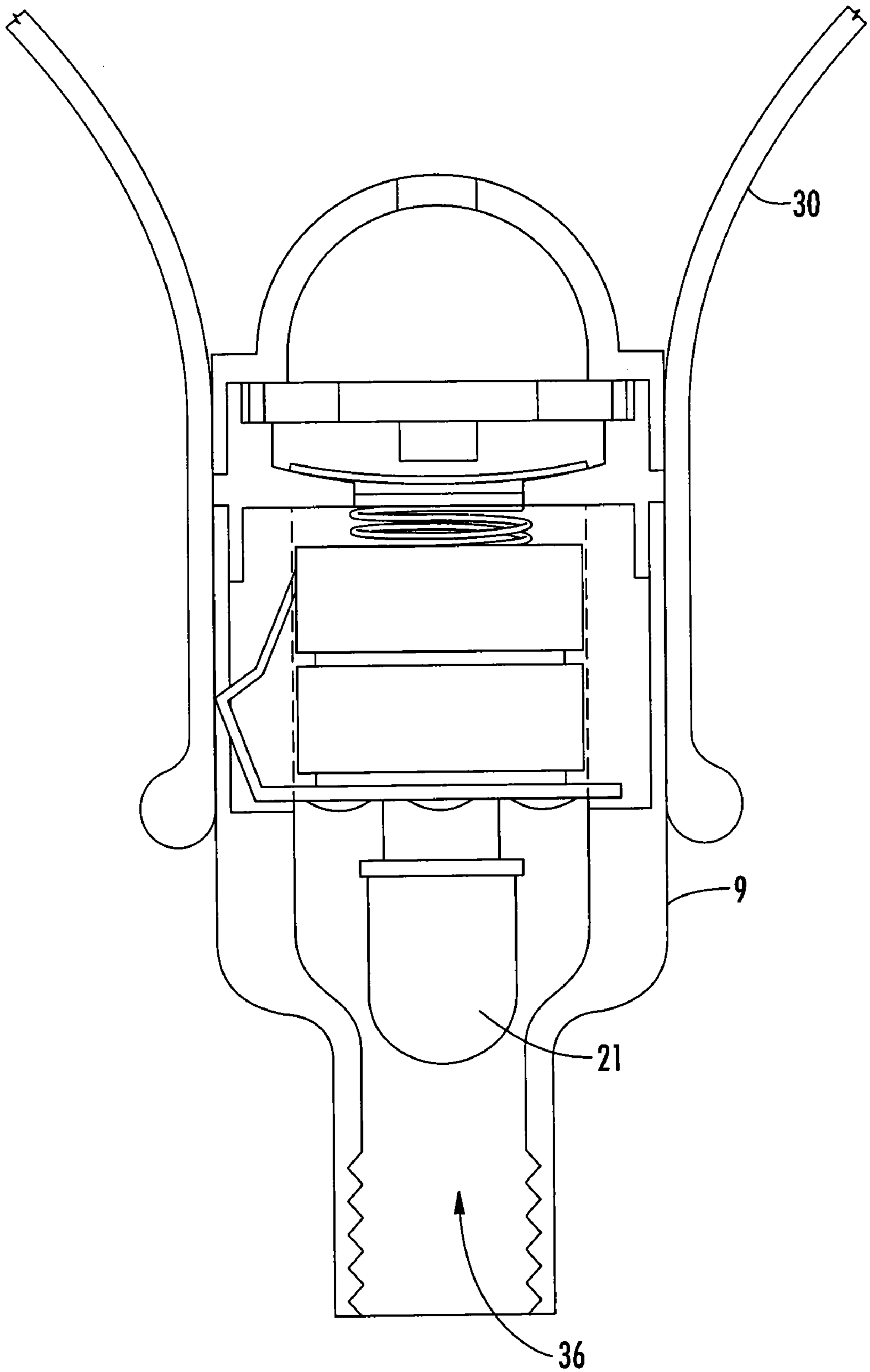
FIG. 8 is a cross section view of another exemplary embodiment of the invention.

FIG. 8 is a cross sectional view of another exemplary embodiment of the invention in which the balloon light 10 is configured so that the light source 21 is disposed proximate the opening 36 of the housing 9, for example, for illuminating an exterior portion of a balloon 30 mounted on the housing 9.

In another aspect of the invention, the upper housing 11 and/or lower housing 12 may be formed from, or include, a fluorescent material that fluoresces in response to ultraviolet (UV) light, or black light, such as UV light emitted by a UV light emitting diode used as the light source 21. In another embodiment, the balloon 30 attached to the balloon light 10 may be formed from, or include, a fluorescent material that fluoresces in response to UV light.

In another exemplary embodiment depicted in FIG. 4, the switch 20 may include a mode switch 74, for example, in communication with the integrated circuit 27, for setting a mode of operation of the light source 21, such as a flash rate, color, or brightness of the light source 21. The mode switch may be operable by a mode activating member 75 having a first end 76 for contacting the mode switch 74 and a second end 78 that extends outwardly, for example, from the upper housing 11 to allow a user to activate the switch from outside the housing 11 by moving the mode activating member 75 at the second end 78.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. An apparatus for sealing and illuminating a balloon comprising:

a housing for sealing insertion into a neck of a balloon;

a flow path within the housing conducting an inflation gas from an inlet to an outlet of the housing;

a flow control system disposed in the flow path allowing the inflation gas to flow from the inlet to the outlet;

a light source mounted in conjunction with the housing;

a power source disposed within the housing providing power for the light source;

a switch mounted in conjunction with the housing and being operable by a portion of the balloon to selectively connect the power source to the light source by completing a circuit between the power source and the light source when the housing is inserted sufficiently within the balloon so that the portion contacts the switch.

2. The apparatus of claim 1, wherein the portion comprises a portion of the neck of the balloon.

3. The apparatus of claim 1, wherein the portion comprises a portion of a marginal bead of the neck of the balloon.

4. The apparatus of claim 3, further comprising an annular recess formed in an outer surface of housing for receiving a marginal bead of the balloon.

5. The apparatus of claim 4, wherein at least a portion of the switch protrudes radially outward into the recess so that it is operable by marginal bead disposed in the recess.

6. The apparatus of claim 1, further comprising a balloon.

7. The apparatus of claim 1, further comprising a motion sensitive switch mounted in conjunction with the housing and disposed in the circuit for selectively connecting the power source to the light source responsive to motion of the housing.

8. The apparatus of claim 1, further comprising a wireless receiver mounted in conjunction with the housing and disposed in the circuit for selectively connecting the power source to the light source responsive to a received signal.

9. The apparatus of claim 1, wherein the switch comprises an integrated electrical circuit.

* * * * *